United States Patent
Dilts

(10) Patent No.: US 9,380,744 B2
(45) Date of Patent: Jul. 5, 2016

(54) AUTOMATICALLY ENGAGING AND DISENGAGING HEADER LOCK ASSEMBLY

(71) Applicant: CNH Industrial America LLC, New Holland, PA (US)

(72) Inventor: Mark David Dilts, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/562,288

(22) Filed: Dec. 5, 2014

(65) Prior Publication Data

US 2015/0082761 A1 Mar. 26, 2015

Related U.S. Application Data

(62) Division of application No. 13/706,951, filed on Dec. 6, 2012, now Pat. No. 8,931,246.

(51) Int. Cl.
- *A01D 67/00* (2006.01)
- *A01D 41/14* (2006.01)
- *A01D 75/20* (2006.01)

(52) U.S. Cl.
CPC .............. *A01D 41/145* (2013.01); *A01D 75/20* (2013.01)

(58) Field of Classification Search
CPC ..... A01D 67/00; A01D 41/145; A01D 33/14; A01B 63/32; A01B 63/30; A01B 63/28; A01B 63/24; A01B 73/005; A01B 63/008
USPC ............... 56/14.5, 208; 172/316, 396, 29, 30; 111/139; 280/414.5

See application file for complete search history.

(56) References Cited

U.S. PATENT DOCUMENTS

| | | | | |
|---|---|---|---|---|
| 2,170,910 | A | * | 8/1939 | Ostruk ......................... 254/426 |
| RE22,932 | E | * | 11/1947 | Acton ........................... 172/316 |
| 2,566,144 | A | * | 8/1951 | Thomas ......................... 56/10.9 |
| 2,580,100 | A | * | 12/1951 | Johansen et al. ........... 280/414.5 |
| 2,647,789 | A | * | 8/1953 | Chayne ............................ 49/383 |
| 2,722,335 | A | * | 11/1955 | Somes, Jr. ..................... 100/230 |
| 2,801,618 | A | * | 8/1957 | Place et al. ..................... 91/367 |
| 2,818,269 | A | * | 12/1957 | Dixon et al. ............... 280/414.5 |
| 2,952,472 | A | | 9/1960 | McNeill |
| 3,008,772 | A | | 11/1961 | Helsel |
| 3,088,546 | A | | 5/1963 | Ross et al. |
| 3,177,976 | A | | 4/1965 | Wenzel |
| 3,517,491 | A | * | 6/1970 | Harer et al. .................... 56/11.9 |
| 3,577,713 | A | | 5/1971 | McCarthy et al. |
| 3,604,186 | A | | 9/1971 | Coleman |
| 3,739,560 | A | | 6/1973 | Slaymaker et al. |
| 3,748,969 | A | | 7/1973 | Hansen |

(Continued)

*Primary Examiner* — Árpád Fábián-Kovács
(74) *Attorney, Agent, or Firm* — Patrick M. Sheldrake

(57) ABSTRACT

A header lift assembly for an agricultural harvester includes a lift cylinder and a lock assembly. The lift cylinder includes a sleeve and a piston, and the piston is configured to move in an axial direction relative to the sleeve. The lock assembly is coupled to the lift cylinder and is configured to automatically transition to a first locking position upon extension of the piston in the axial direction to a locking distance from the sleeve. The first locking position is configured to block retraction of the piston in the axial direction beyond a first distance from the sleeve. The lock assembly is also configured to automatically disengage from the first locking position to an unlocked position that facilitates retraction of the piston beyond the first distance upon extension of the piston to an unlocking distance.

3 Claims, 6 Drawing Sheets

(56) References Cited

U.S. PATENT DOCUMENTS

| | | | | |
|---|---|---|---|---|
| 3,905,279 | A | 9/1975 | Yadon | |
| 3,981,126 | A | 9/1976 | Hocking | |
| 3,982,648 | A | 9/1976 | Luedtke et al. | |
| 4,023,649 | A | 5/1977 | Wood | |
| 4,067,176 | A * | 1/1978 | Hoch et al. | 56/15.6 |
| 4,073,345 | A | 2/1978 | Miller | |
| 4,206,582 | A * | 6/1980 | Molzahn et al. | 56/15.8 |
| 4,240,334 | A | 12/1980 | Crosser | |
| 4,276,814 | A | 7/1981 | Bass et al. | |
| 4,368,609 | A | 1/1983 | Hutchinson | |
| 4,373,591 | A * | 2/1983 | Schaaf | A01B 59/04 172/328 |
| 4,541,229 | A | 9/1985 | Elijah | |
| 4,811,983 | A | 3/1989 | Watts et al. | |
| 5,183,235 | A | 2/1993 | Arzouman et al. | |
| 6,164,625 | A * | 12/2000 | Shockley et al. | 254/8 B |
| 6,648,579 | B2 | 11/2003 | Vartanian | |
| 7,219,768 | B2 | 5/2007 | Climenhaga | |
| 7,640,719 | B2 | 1/2010 | Boyko | |
| 8,336,639 | B2 * | 12/2012 | Palen | A01B 63/22 172/328 |
| 2004/0247382 | A1 * | 12/2004 | Leemans et al. | 403/322.3 |
| 2006/0254239 | A1 * | 11/2006 | Fackler et al. | 56/15.8 |
| 2007/0214760 | A1 * | 9/2007 | Bomleny et al. | 56/10.2 E |
| 2007/0294990 | A1 | 12/2007 | Coers et al. | |
| 2009/0107097 | A1 * | 4/2009 | Thompson et al. | 56/15.8 |
| 2009/0301367 | A1 * | 12/2009 | Martin | 111/139 |
| 2012/0152109 | A1 | 6/2012 | Wagner et al. | |
| 2013/0305677 | A1 * | 11/2013 | Patterson et al. | 56/14.5 |

* cited by examiner

AUTOMATICALLY ENGAGING AND DISENGAGING HEADER LOCK ASSEMBLY

This divisional application claims priority under 35 U.S.C. §120 from copending U.S. patent application Ser. No. 13/706,951 filed on Dec. 6, 2012 by Mark D. Dilts with the same title, the full disclosure of which is hereby incorporated by reference.

BACKGROUND

The invention relates generally to agricultural equipment, such as harvesters, and more specifically, to an automatically engaging and disengaging header lock assembly.

A harvester may be used to harvest agricultural crops, such as barley, beans, corn, cotton, flax, oats, rye, soybeans, wheat, grass seed, or other plant seed bearing crops. Moreover, a combine (e.g., combine harvester) is a specific type of harvester generally used to harvest grains (e.g., barley, corn, flax, oats, rye, soybeans, wheat, etc.). Accordingly, a combine may be used to separate a plant into different agricultural materials, such as separating corn ears from the stalks. During operation of a combine, the harvesting process begins by removing a portion of the plant from the ground via a cutting and gathering device (e.g., a header). The combine then moves the plant from the header into the processing area with a feeder system. Once inside the processing area, the plant undergoes processes that separate it into different agricultural materials (e.g., stalks, ears, grain, etc.).

A height of the header may be adjusted relative to the ground to harvest crops of varying heights, and to provide maintenance access. For example, during maintenance operations, lift cylinders may extend a piston relative to a sleeve to raise the header to a desired height. The operator may then engage a lock assembly (e.g., between the header and the sleeve) to maintain the header at the desired height. Unfortunately, manual engagement and disengagement of the lock assembly adds additional steps to the maintenance operation, thereby delaying an operator from resuming operation of the harvester. An operator may occasionally forget to manually engage the lock assembly. Manual disengagement may be inconvenient if the operator must leave the cab to disengage the lock assembly.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a header lift assembly for an agricultural harvester includes a lift cylinder and a lock assembly. The lift cylinder includes a sleeve and a piston, and the piston is configured to move in an axial direction relative to the sleeve. The lock assembly is coupled to the lift cylinder and is configured to automatically transition to a first locking position upon extension of the piston in the axial direction to a locking distance from the sleeve. The first locking position is configured to block retraction of the piston in the axial direction beyond a first distance from the sleeve. The lock assembly is also configured to automatically disengage from the first locking position to an unlocked position that facilitates retraction of the piston beyond the first distance upon extension of the piston to an unlocking distance.

In another embodiment, a header lift assembly for an agricultural harvester includes a header and a lift assembly. The lift assembly comprises a lift cylinder and a lock assembly, and the lift assembly is configured to adjust a height of the header. The lift cylinder includes a sleeve, a piston, and a pivot. The piston is configured to move in an axial direction relative to the sleeve to adjust the height of the header. The pivot is disposed at a first end of the piston or at a second end of the sleeve. The lock assembly includes a guide plate coupled to the pivot. The guide plate is configured to rotate about the pivot into a first locking position when the piston is extended in the axial direction to a locking distance from the sleeve. The guide plate in the first locking position is configured to block retraction of the piston in the axial direction beyond a first distance from the sleeve. The guide plate is also configured to rotate about the pivot into an operating position when the piston is extended in the axial direction to an unlocking distance. The operating position is configured to enable the piston to retract beyond the first distance.

In another embodiment, a header lift assembly for an agricultural harvester includes a lock assembly configured to automatically engage in a first locking position when a header is raised to a lock height. The first locking position is configured to maintain the header at a maintenance height. The lock assembly is configured to automatically disengage from the first locking position when the header is raised from the maintenance height.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Figure 1:
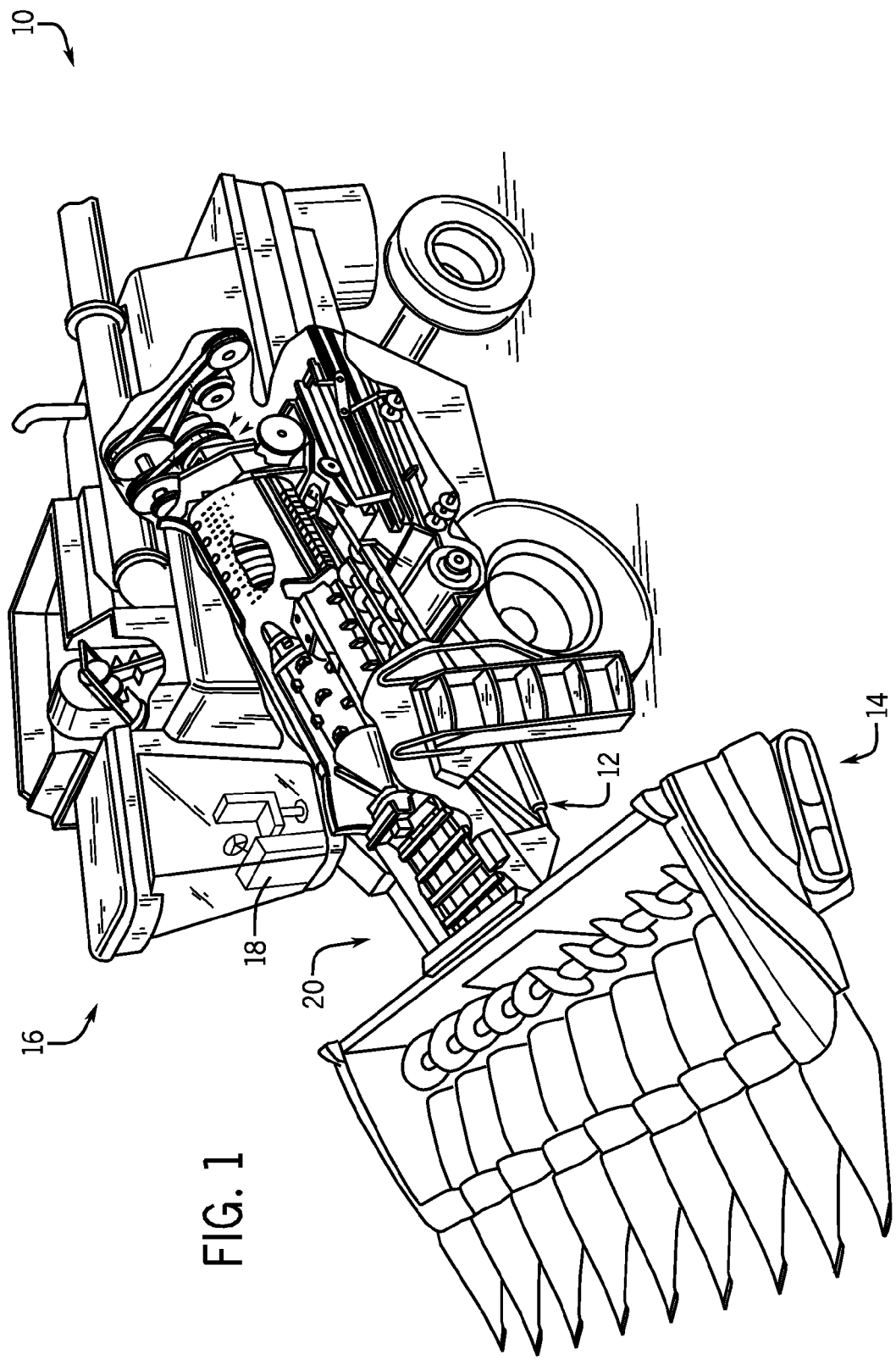
FIG. 1 is a perspective view of an embodiment of a harvester with a header lift assembly that may include a lock assembly.

Turning now to the drawings, FIG. 1 is a perspective view of a harvester 10 (e.g., combine) with a header lift assembly 12 extending between the harvester 10 and a header 14. The harvester 10 may harvest grains such as barley, corn, flax, oats, rye, soybeans, wheat, and so forth. Accordingly, the harvester 10 is configured to remove desired portions of plants from the ground, and to separate the plant portions into a first agricultural material and a second agricultural material. For example, the harvester may be configured to separate corn into ears and stalks. The header lift assembly 12 may raise the header 14 relative to the ground to adjust a cutting height of the header, and/or for providing access to the header 14, such as for maintenance. The header lift assembly 12 includes a lift cylinder (e.g., hydraulic, pneumatic, or electric) that extends to raise the header 14. An automatic header lock assembly, as described in detail below, may engage the lift cylinder to retain the lift cylinder in an extending position, thereby maintaining the height of the header 14 relative to the ground. The automatic header lock assembly may be engaged and disengaged automatically via movement of the lift cylinder. For example, raising the header 14 to a lock height (e.g., approximately 60 inches) may automatically engage the header lock assembly, thereby retaining the header 14 at a maintenance height (e.g., approximately 36 to 54 inches). Raising the header 14 again from the maintenance height to an unlocking height (e.g., approximately 56 inches) may disengage the header lock assembly so that the header 14 may be lowered below the maintenance height (e.g., to a minimum or ground height).

The harvester 10 employs the header 14 to remove the desired portions of plants during harvesting operations. An operator of the harvester 10 may be seated in a cab 16, and may monitor and control the operation of the header 14 and other systems of the harvester 10 via a user interface 18 (e.g., steering wheel, pedals, levers, buttons, and so forth). After removing the plants, the harvester 10 transports the plants to a feeder assembly 20. The feeder assembly 20 moves the plants from the header 14 into a body of the harvester 10 for processing. Once inside the harvester body, the plants undergo various processes that separate the plant into different agricultural products (e.g., grain, cobs, chaff, straw). The different agricultural products may then exit the harvester 10 for later use or disposal.

Figure 2:
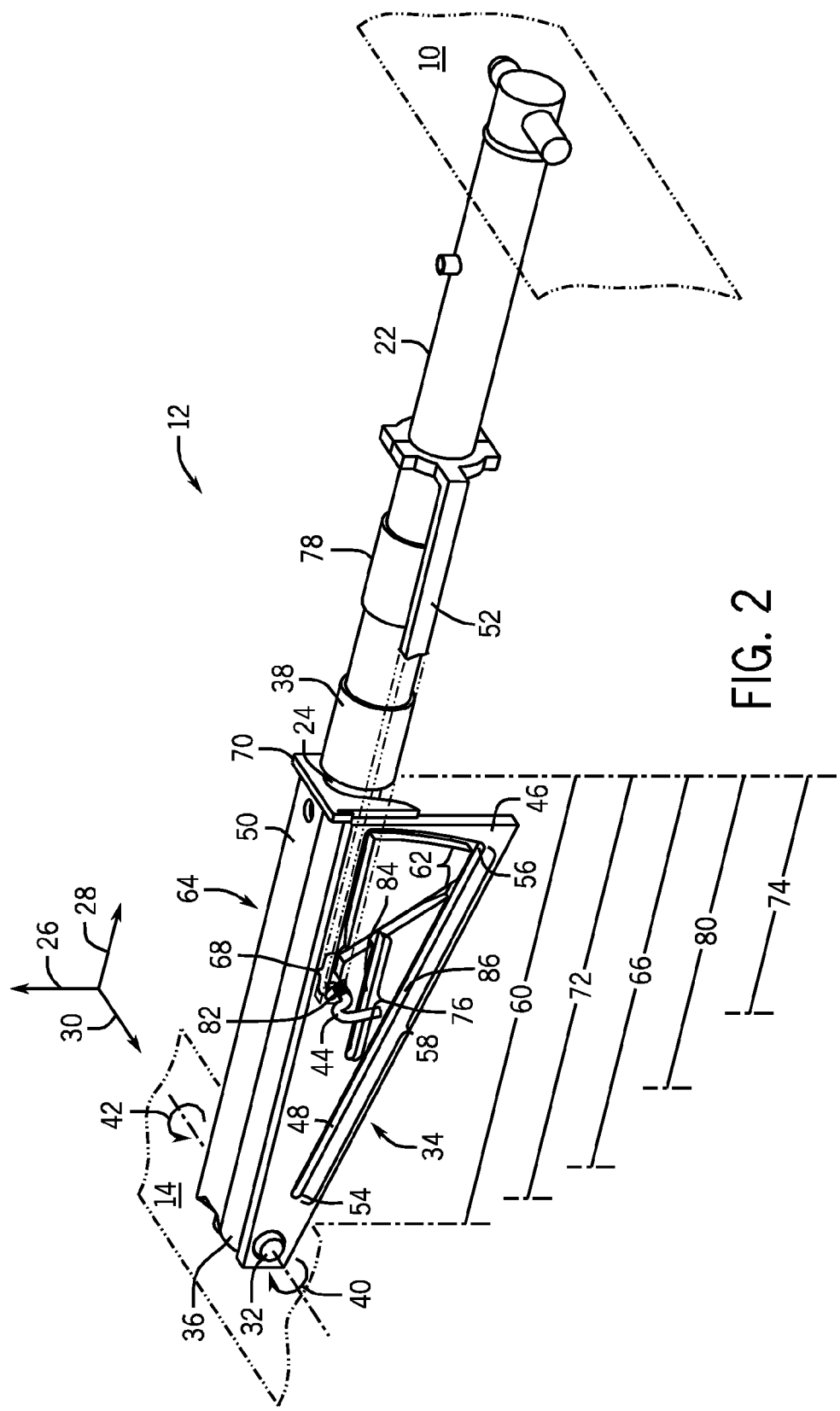
FIG. 2 is a perspective view of an embodiment of a header lift assembly and a lock assembly that may be coupled to the harvester of FIG. 1.

FIG. 2 is a perspective view of an embodiment of the header lift assembly 12 that may be employed with the harvester 10 of FIG. 1. The header lift assembly 12 includes a sleeve 22 and a piston 24. In some embodiments, the lift assembly 12 may be driven by hydraulics, compressed air (e.g. pneumatics), or electricity. The piston 24 may telescope within the sleeve 22 such that the piston 24 extends from the sleeve 22, and the piston 24 retracts within the sleeve 22. While the illustrated sleeve 22 is coupled to the harvester 10 and the illustrated piston 24 is coupled to the header 14, other embodiments may include a sleeve coupled to the header 14 and a piston coupled to the harvester 10. For ease of explanation, the header lift assembly 12 may be described in relation to a coordinate system along a vertical Y-axis 26, a lateral X-axis 28, and a lateral Z-axis 30. Points higher along the Y-axis 26 may be referred to as "above," "over," and so forth, whereas points lower along the Y-axis 26 may be referred to as "below," "under," and so forth. The X-axis 28 may extend substantially through the header lift assembly 12. Motion along the X-axis 28 may be referred to as axial motion or motion in an axial direction. The Z-axis 30 extends through a pivot 32 that couples a lock assembly 34 to the header lift assembly 12. As illustrated, the pivot 32 is positioned at a first end 36 of the piston 24 proximate to the header 14. However, in an alternative embodiment, the pivot may be positioned at a second end 38 of the sleeve 22 proximate to the piston 24. The lock assembly 34 may rotate about the Z-axis 30 in a clockwise direction 40 or counter-clockwise direction 42.

In the illustrated embodiment, the lock assembly 34 includes a pin 44, a guide plate 46 with a pathway 48 to accommodate the pin 44, and a stop 50. As illustrated, the pin 44 is coupled to a rod 52, which is coupled to the sleeve 22. Alternatively, the pin 44 may be coupled to the piston 24, and the guide plate 46 may be coupled to the sleeve 22. Movement of the piston 24 along the X-axis 28 drives the pin 44 to move relative to the pathway 48. The geometry of the pathway 48 enables the guide plate 46 to convert the axial motion of the piston 24 to rotational motion of the guide plate 46 and the stop 50 about the pivot 32. For example, the pin 44 may be positioned at a first end 54 of the pathway 48 proximate to the pivot 32 when the piston 24 is substantially retracted. The pin 44 may move relative to the guide plate 46 toward a second end 56 of the pathway 48 as the piston 24 extends. Additional features (e.g., ramps) of the pathway 48 may enable the pin 44 to travel in one direction along the pathway 48, but substantially prevent travel in the opposite direction. Thus, the pin 44 may be guided to different paths based on the direction of travel relative to the pathway 48. In the illustrated embodiments, the stop 50 does not engage the sleeve 22 (e.g., restrict the retraction of the piston 24) when the pin 44 is positioned within an operating pathway 58 between the first end 54 and the second end 56. The piston 24 may extend and retract along a range of motion corresponding to movement of the pin 44 along the operating pathway 58 between the first end 54 and the second end 56.

When the piston 24 is extended to a locking distance 60 from the sleeve 22, the pin 44 is positioned at the second end 56 of the operating pathway 58. Accordingly, the pathway 48 guides the pin 44 (e.g., via rotation of the guide plate 46 due to the influence of gravity or other force) to a locking pathway 62 that enables the stop 50 to be positioned in a first locking position 64, as illustrated. In the first locking position 64, the stop 50 is positioned between the first end 36 of the piston 24 and the second end 38 of the sleeve 22. Contact between the stop 50 and the sleeve 22 blocks retraction of the piston 24 relative to the sleeve 22 beyond a first distance 66. For example, the locking pathway 62 may guide the pin 44 from the second end 56 of the operating pathway 58 to a first locking region 68, thereby enabling the piston 24 to retract from the locking distance 60 to the first distance 66, and blocking further retraction. Blocking retraction of the piston 24 may substantially maintain a height (e.g., maintenance height) of the header 14 relative to the ground, which corresponds to the first distance 66. That is, the lock assembly 34 automatically engages upon extending the piston 24 to the locking distance 60, maintaining the relative extension of the piston 24 to at least the first distance 66. When the stop 50 is in the first locking position 64, a stop plate 70 contacts the second end 38 of the sleeve 22 to restrict retraction of or block the piston 24 relative to the sleeve 22. The stop 50 in the first locking position 64 may substantially block the piston 24 from retracting beyond the first distance 66 (e.g., due to loss of hydraulic fluid, loss of compressed air, or loss of electrical power to the lift assembly 12).

The piston 24 may be extended from the first distance 66 to an unlocking distance 72 so that the pin 44 moves from the first locking region 68 to the operating pathway 58. Moving the pin 44 from the first locking region 68 to the operating pathway 58 rotates the guide plate 56 upward along the Y-axis 26 (e.g., in the counter-clockwise direction 42), and disengages the stop 50 from the sleeve 24. By disengaging the stop 50, the piston 24 may extend and retract along its range of motion between the locking distance 60 and a retracted distance 74.

In some embodiments, the locking pathway 62 may include a second locking region 76. As described above, extending the piston 24 from the first distance 66 moves the pin 44 along the locking pathway 62 toward the operating pathway 58. By retracting the piston 24 when the pin 44 is below (e.g., along the Y-axis 26) the second locking region 76, the pin 44 enters the second locking region 76, thereby rotating the guide plate 46 in the clockwise direction 40 to a second locking position. In some embodiments, the stop plate 70 in the second locking position may interface with a locking feature 78 to substantially block the piston 24 from retracting beyond a second distance 80. Blocking retraction of the piston 24 may substantially maintain a height (e.g., second maintenance or transport height) of the header 14 relative to the ground corresponding to the second distance 80.

In some embodiments, the pin 44 may be biased along the Z-axis 30 into the pathway 48, such as by a spring 82. The pin 44 may be manually adjusted to change the position relative to the pathway 48. For example, the pin 44 may be moved between the operating pathway 58 and the first locking region 68 or second locking region 76. Manually adjusting the position of the pin 44 relative to the pathway 48 may enable the stop 50 to be rotated manually about the pivot 32 to engage and/or disengage the sleeve 24 with or without manually adjusting the piston 24. For example, extending the piston 24 to the first distance 66 enables the operator to manually move the pin 44 to enter the first locking region 68, to enter the second locking region 76 at a first intermediate point 84, or to enter the operating pathway 58 at a second intermediate point 86. The piston 24 may retract to the first distance 66 when the pin 44 is positioned within the first locking region 68; the piston 24 may retract to the second distance 80 when the pin 44 is positioned within the second locking region 76 (e.g., at the first intermediate point 84); and the piston 24 may retract to the retracted distance 74 when the pin 44 is positioned within the operating pathway 58.

Figure 3:
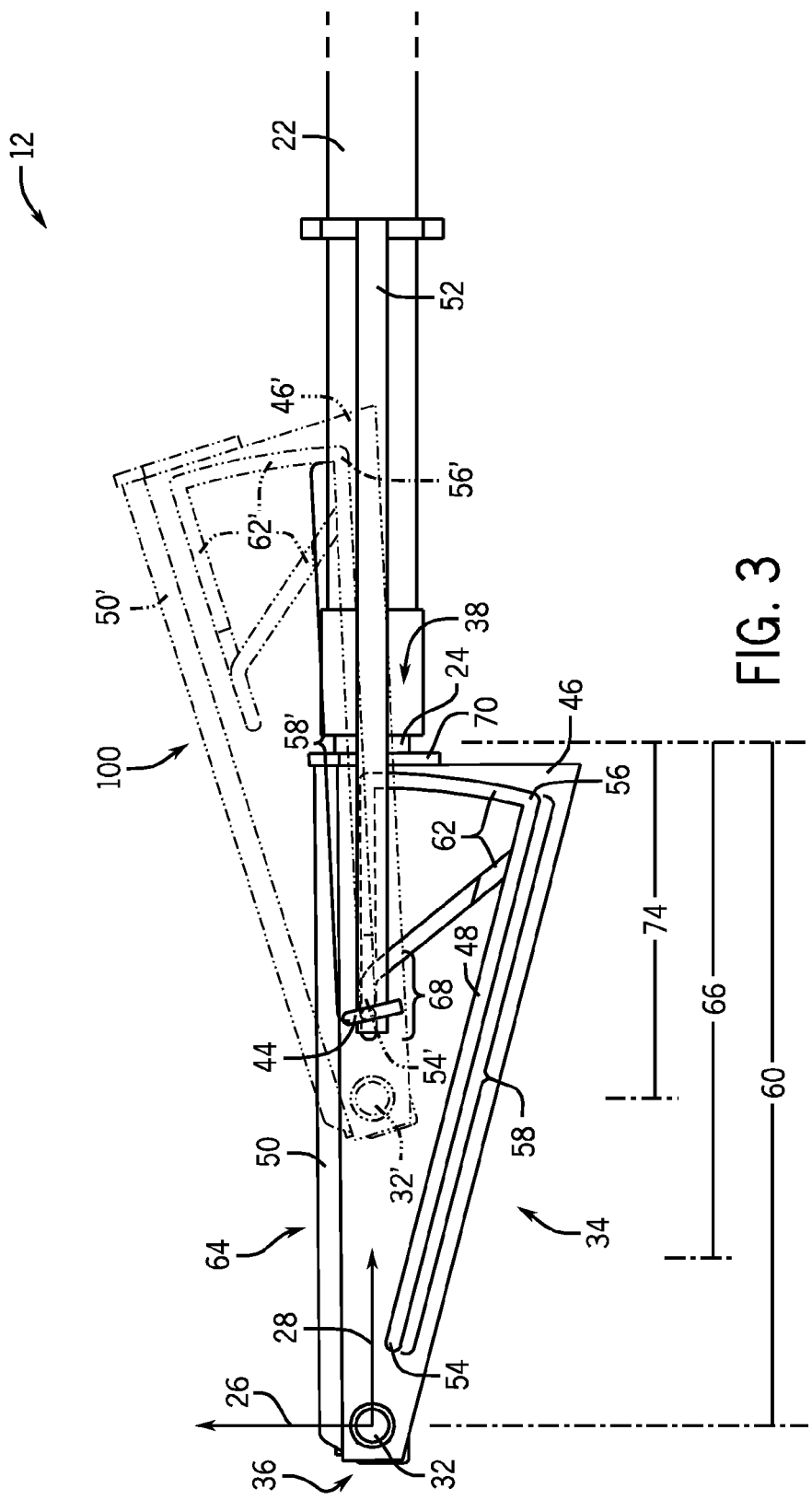
FIG. 3 is a side view of an embodiment of a lock assembly in an engaged position and a disengaged position.

FIG. 3 is a side view of the header lift assembly 12 and the stop 50 of the lock assembly 34. The stop 50 is shown in the first locking position 64, and in an operating position 100 as shown in dashed lines. With the stop 50 in the first locking position 64, the piston 24 is extended the first distance 66 from the sleeve 22 of the lift assembly 12. As described, the pin 44 is positioned within the first locking region 68 to enable the stop 50 and the stop plate 70 to block retraction of the piston 24 beyond the first distance 66. In some embodiments of the first locking position 64, the stop 50 may lie horizontally substantially along the X-axis 28 with the sleeve 22, piston 24, pin 44, and rod 52.

The piston 24 may be extended from the first distance 66, thereby moving the pin 44 within the locking pathway 62 from the first locking region 68 toward the operating pathway 58. Moving the pin 44 relative to the guide plate 46 induces the guide plate 46 and the stop 50 to rotate about the pivot 32. However, while the pin 44 is within the locking pathway 62, the stop 50 and the stop plate 70 may block retraction of the piston 24. In the operating position 100, the stop 50 and stop plate 70 may remain in a substantially constant orientation relative (e.g., parallel) to the X-axis 28 as the piston 24 retracts and moves the pin 44 moves from the second end 56 to the first end 54.

In the illustrated embodiment, the pin 44 is coupled to the sleeve 22 by the rod 52. The pivot 32, the guide plate 46, and the stop 50 are coupled to the piston 24. The pin 44 and the rod 52 remain substantially fixed relative to the piston 24 while the pin 44 is positioned within the pathway 48. Adjusting the piston 24 along the X-axis 28 moves the pin 44 within the pathway 48, thereby rotating the guide plate 46 and the stop 50 about the pivot 32 according to the features of the pathway 48. In the operating position 100, the guide plate 46' and the stop 50' rotate upwardly along the Y-axis 26 as the piston 24 retracts. The guide plate 46' and the stop 50' rotate downwardly along the Y-axis 26 when the piston 24 extends to distance 60. In the operating position 100, the pin 44 is proximate to the first end 54' of the operating pathway 58', which corresponds to the piston 24 retracted to the retracted distance 74 relative to the sleeve 22. The guide plate 46' rotates about the pivot 32' to enable the substantially fixed pin 44 to move in the operating pathway 58' along the X-axis 28. As the piston 24 extends to the locking distance 60, the pin 44 moves along the operating pathway 58' to the second end 56'. When the pin 44 is positioned at the second end 56', the pin 44 enters the locking pathway 62' to enable the guide plate 46' and the stop 50' to rotate down to the first locking position 64 along the X-axis 28.

Figure 4:
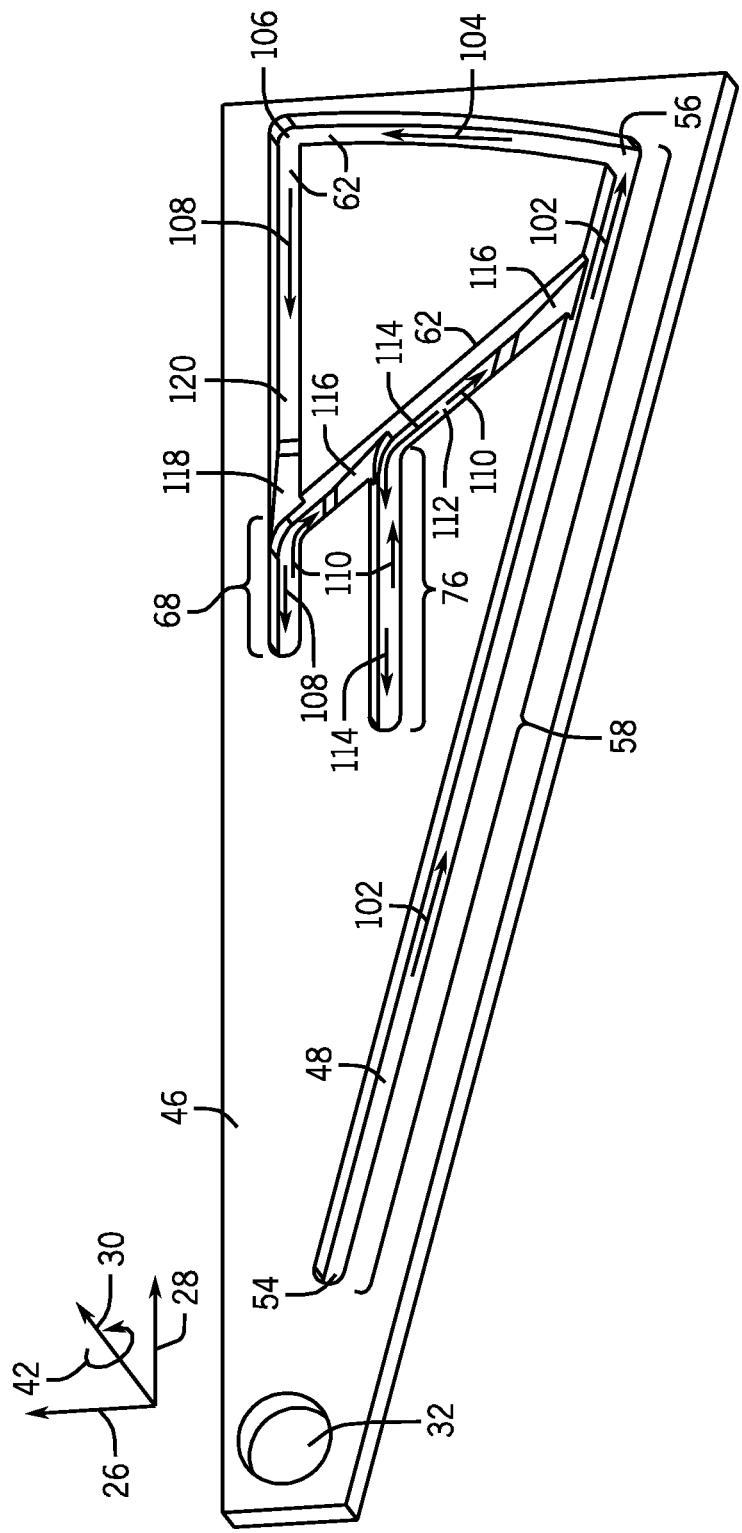
FIG. 4 is a perspective view of an embodiment of a guide plate of the header lift assembly.

FIG. 4 is a perspective view of an embodiment of the guide plate 46 having the first locking region 68 and the second locking region 76. The position of the pin 44 within the pathway 48 is based at least in part on the extension or retraction of the piston 24 relative to the sleeve 22. When the piston 24 is retracted to the retracted distance 74, the pin 44 is positioned at the first end 54 of the operating pathway 58. Extending the piston 24 moves the pin 44 in the first direction 102 relative to the guide plate 46 along the operating pathway 58. When the piston 24 is extended to the locking distance 60, the pin 44 is positioned at the second end 56. The locking pathway 62 enables the guide plate 46 and the stop 50 to rotate about the pivot 32 to the first locking position 64. Positioning the pin 44 at the second end 56 enables the pin 44 to move relative to the guide plate 46 in the second direction 104 to an intermediate region 106. In the first locking position 64 with the pin 44 in the first locking region 68, the stop 50 blocks retraction of the piston 24 beyond the first distance 66. The piston 24 may retract from the locking distance 60 to the first distance 66, which in turn moves the pin 44 relative to the guide plate 46 in a third direction 108 from the intermediate region 106 to the first locking region 68, and establishes contact between the stop plate 70 and the sleeve 22.

The piston 24 may be extended from the first distance 66, thereby moving the pin 44 relative to the guide plate 46 in a fourth direction 110 along the locking pathway 62 toward the operating pathway 58. When the pin 44 moves relative to the guide plate 46 beyond the second locking region 76 (e.g., to a transition point 112) along the locking pathway 62, retraction of the piston 24 moves the pin 44 relative to the guide plate 46 in a fifth direction 114 into the second locking region 76. When the pin 44 is positioned within the second locking region 76, the guide plate 46 and the stop 50 rotate about the pivot 32 to the second locking position, thereby blocking retraction of the piston 24 beyond the second distance 80. In some embodiments, the piston 24 may be extended from the first distance 66 directly to an unlocking distance 60. That is, the pin 44 may be moved relative to the guide plate 46 in the fourth direction 110 from the first locking region 68 to the operating pathway 58 without entering the second locking region 76.

In some embodiments, the locking pathway 62 may include one or more ramps 116 that guide the pin 44 through the locking pathway 62 in substantially one direction (e.g., counter-clockwise 42 as shown in FIG. 4). The ramps 116 may include a ridge 118 that raises the pin 44 from the channel floor 120 while retaining the pin 44 within the pathway 48. Ramps 116 may be arranged between the intermediate region 106 and the first locking region 68, between the first locking region 68 and the second locking region 76, and/or between the second locking region 76 and the operating pathway 58. In some embodiments, the ramps 116 may guide the pin 44 from the second end 56 of the operating pathway 58 to the intermediate region 106, then to the first locking region 68, optionally to the second locking region 76, and then back to the operating pathway 58. While two locking regions 68 and 76 are shown in FIG. 4, some embodiments of the guide plate 46 coupled to the piston 24 may include only the first locking region 68 (e.g., FIG. 3), or three or more locking regions that restrict (e.g., block) the piston 24 at three or more corresponding distances relative to the sleeve 22.

Figure 5:
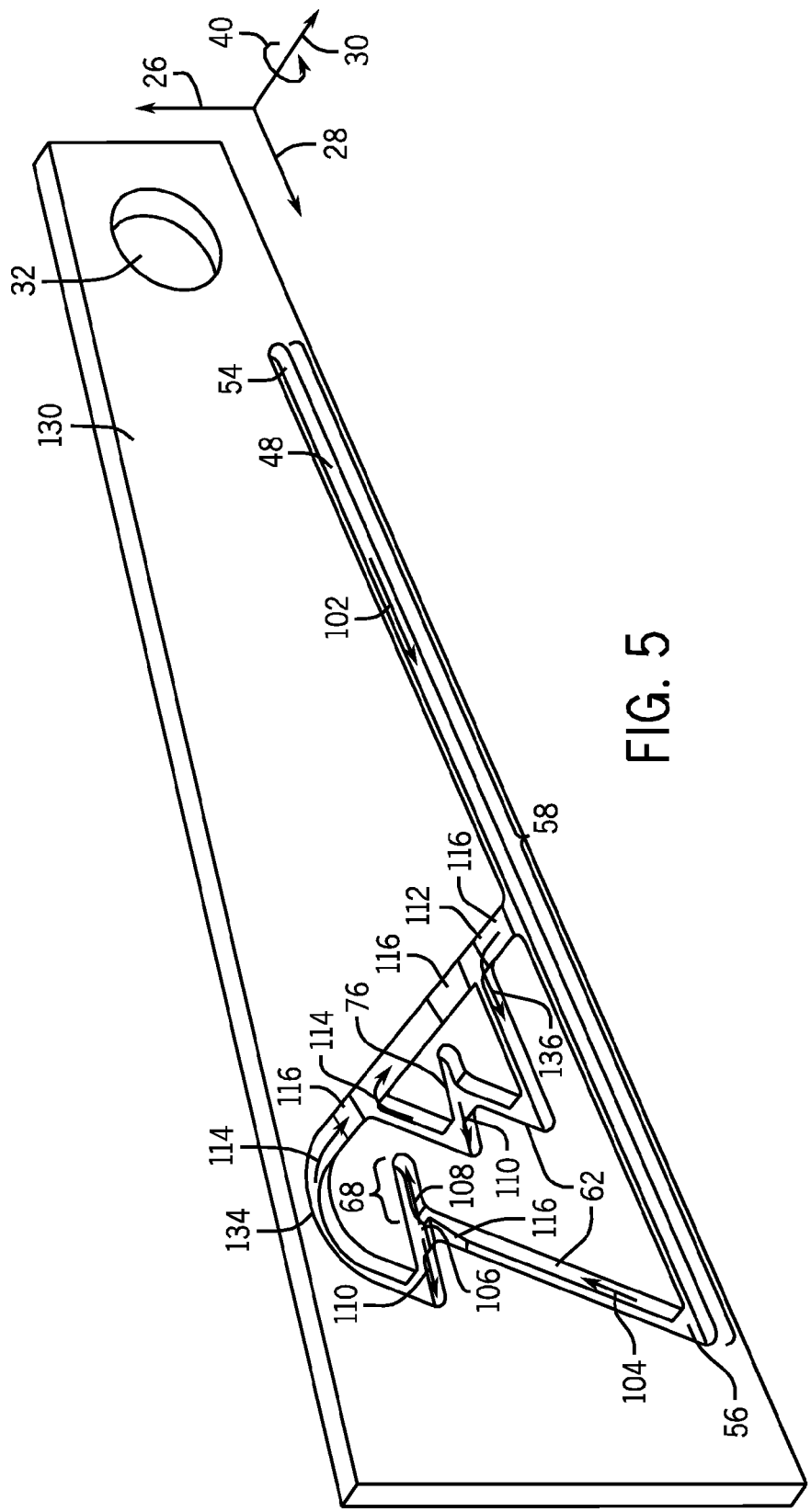
FIG. 5 is a perspective view of an alternative embodiment of an axially fixed guide plate that may be employed within the header lift assembly.
Figure 6:
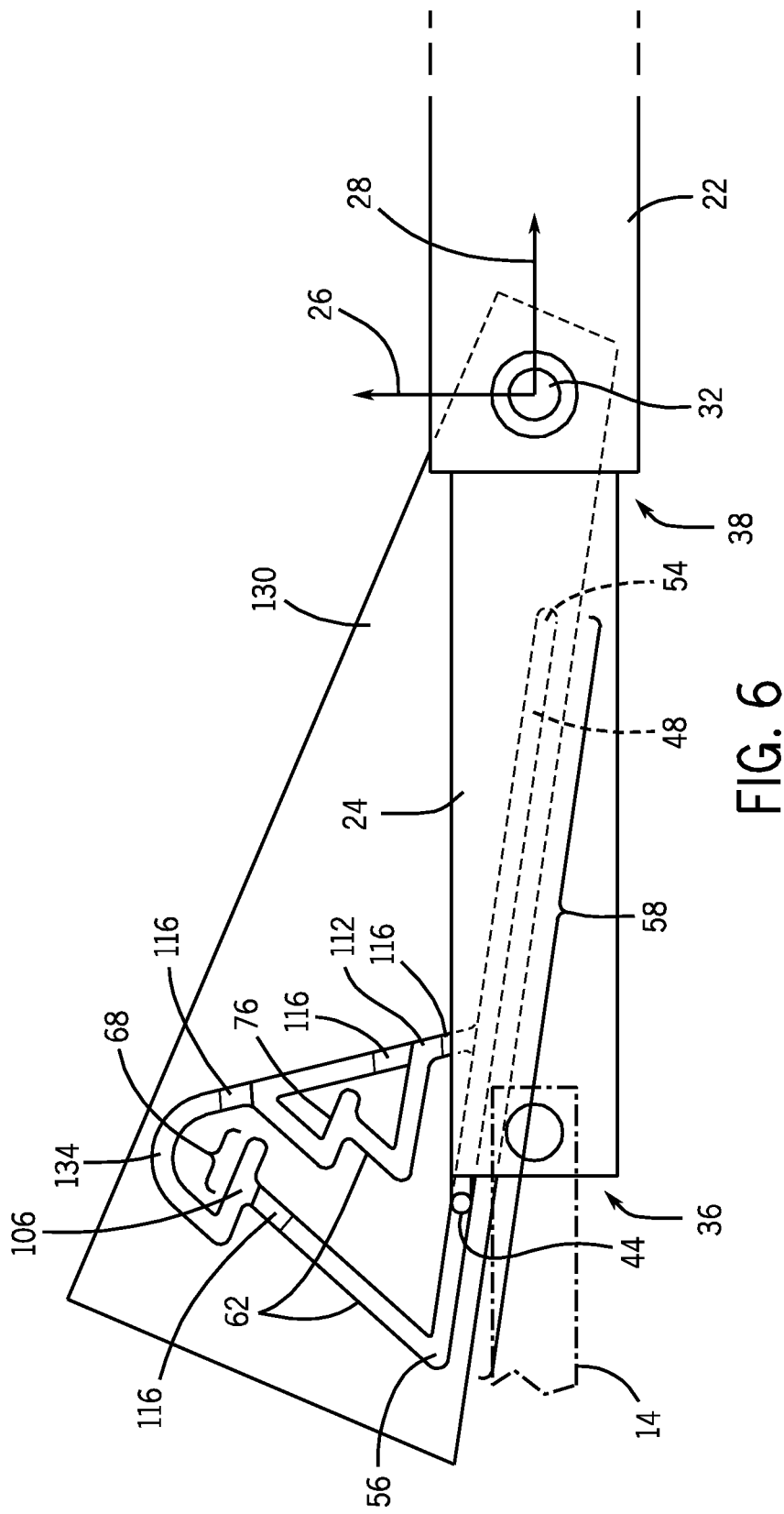
FIG. 6 is a side view of the alternative embodiment of header lift assembly having the axially fixed guide plate.

FIG. 5 is a perspective view of an embodiment of an axially fixed guide plate 130 configured to couple to the sleeve 22. The axially fixed guide plate 130 may be coupled at the joint 32 to the sleeve 22 to rotate about the joint 32 to engage or disengage the lock assembly. The pin 44 may be coupled to the first end 36 of the piston 24 so that the pin 44 moves along the X-axis 28 as shown in FIG. 6. The pin 44 and the axially fixed guide plate 130 operate in a substantially similar manner to the pin 44 and the guide plate 46 discussed above with reference to FIGS. 2-4. That is, the pin 44 and axially fixed guide plate 130 operate to raise (e.g., disengage) and lower (e.g., engage) axially fixed guide plate 130 to block retraction of the piston 24. Whereas the guide plate 46 is coupled to the joint 32 at the first end of the piston 24 of FIG. 2, the axially fixed guide plate 130 is coupled to the joint 32 at the second end of the sleeve 22 of FIG. 6. In the illustrated embodiment, the pin 44 coupled to the first end 36 of the piston 24 may enter the first locking portion 68 of the pathway 48 to block the retraction of the piston 24.

For the embodiments illustrated in FIGS. 5 and 6, the pin 44 is positioned at the first end 54 of the operating pathway 58 of the axially fixed guide plate 130 when the piston 24 is retracted to the retracted distance 74. Extending the piston 24 moves the pin 44 in the first direction 102 relative to the axially fixed guide plate 130 along the operating pathway 58. When the piston 24 is extended to the locking distance 60, the pin 44 is positioned at the second end 56. The locking pathway 62 enables the pin 44 to move in the second direction 104 to the intermediate region 106 as the axially fixed guide plate 130 rotates about the pivot 32 to the first locking position 64. In the first locking position 64, the piston 24 may retract from the locking distance 60 to the first distance 66, thereby moving the pin 44 in the third direction 108 from the intermediate region 106 to the first locking region 68. The first locking region 68 retains the pin 44, thereby blocking further retraction of the piston 24 beyond the first distance 66.

The piston 24 may be extended from the first distance 66 to the locking distance 60, thereby moving the pin 44 in the fourth direction 110 from the first locking region 68 to a top portion 134 of the locking pathway 62. The pin 44 then moves in the fifth direction 114 along the locking pathway 62 as the piston 24 retracts from the locking distance 60. When the pin 44 moves beyond the second locking region 76 (e.g., to the transition point 112) along the locking pathway 62, extension of the piston 24 to the second locking distance 80 moves the pin 44 in a sixth direction 136 into the second locking region 76. When the pin 44 is positioned within the second locking region 76, the axially fixed guide plate 130 rotates about the pivot 32 to the second locking position to block retraction of the piston 24 beyond the second distance 80. The piston 24 may be extended from the second distance 80 to move the pin 44 from the second locking region 76 to the locking pathway 62. The piston 24 may then be retracted to move the pin 44 in the fifth direction 114 toward the operating pathway 58. In some embodiments, the pin 44 may bypass the second locking region 76 and move directly in the fifth direction 114 from the top portion 134 to the operating pathway 58.

As discussed above with regard to the embodiments shown in FIGS. 2 and 4, the locking pathway 62 of the axially fixed guide plate 130 may include one or more ramps 116 that guide the pin 44 through the locking pathway 62 in substantially one direction (e.g., the clockwise direction 40 as shown in FIG. 5). One or more ramps 116 may be positioned in the locking pathway 62 between the second point 56 and the first locking region 68, between the top portion 134 and the second locking region 76, and/or between the second locking region 76 and the operating pathway 58.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A header lift assembly for an agricultural harvester, comprising:
    a cylinder comprising a sleeve and a piston, wherein the piston is configured to move in an axial direction relative to the sleeve; and
    a lock assembly coupled between the sleeve and piston of the cylinder comprising a pin and a pivotally mounted guide plate comprising a pathway, the pathway is configured to accommodate the pin for movement therein, wherein the geometry of the pathway is shaped and configured to convert axial motion of the piston to rotational movement of the guide plate as the cylinder is extended and retracted, the pathway configured to automatically move to engage in a locking region with the pin after extension of the piston in the axial direction to a locking distance from the sleeve when a header is raised to a lock height, wherein the locking region is configured to maintain the header at a maintenance height, and the pathway is aligned and configured to automatically disengage the pin from the locking region when the piston is extended from the cylinder and the header is raised from the maintenance height to an unlocking height;
    wherein the pathway comprises an operating pathway and a locking pathway branching from the operating pathway, the locking pathway having at least one region and two connections to the operating pathway, wherein position of a first one of the connections of the operating pathway to the locking pathway corresponds to the locking distance.

2. The header lift assembly of claim 1, wherein the geometry of the locking pathway is shaped and configured to automatically disengage from the locking region when the header is raised by extension of cylinder from the maintenance height to an unlocking height, wherein the lock height is greater than the maintenance height and the unlocking height, and the unlocking height is greater than the maintenance height with respect to a ground surface.

3. The header lift assembly of claim 2, wherein the locking region corresponds to engagement of the pin within a branch of the locking pathway.

* * * * *